G. W. Hurst.
Churn.
Nº 63,639.      Patented Apr. 9, 1867.
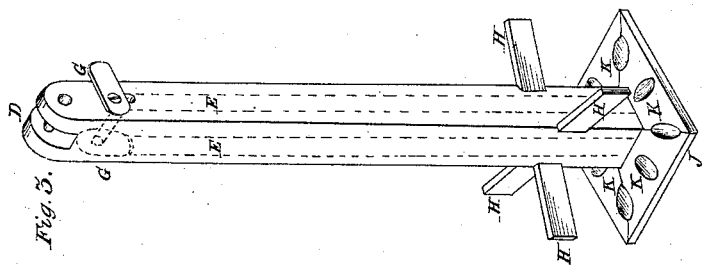
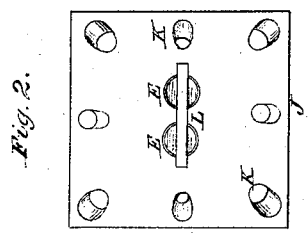
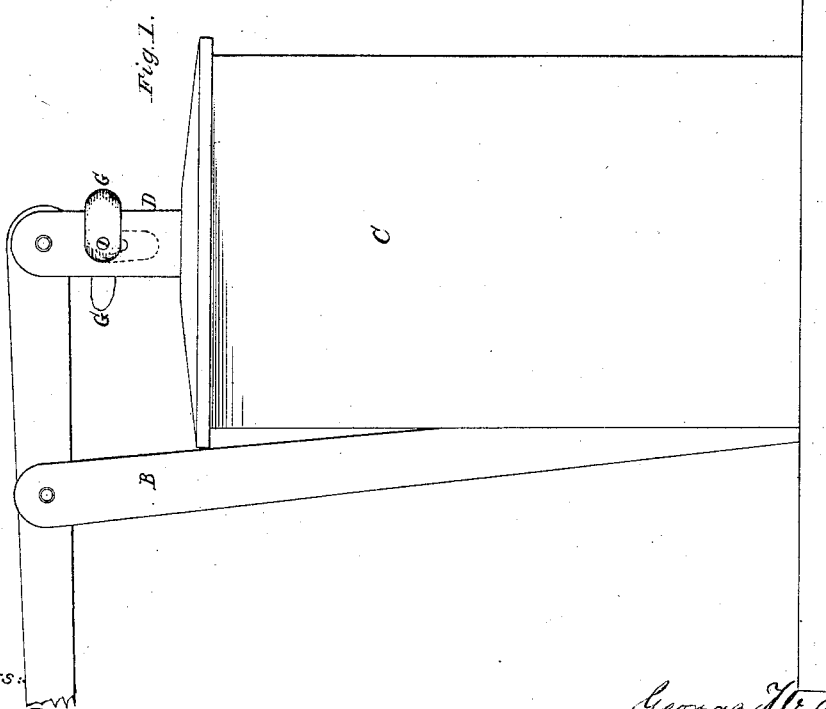
WITNESSES:
Leroy Dillenburg
D. H. Tift
INVENTOR:
George W. Hurst
By his Atty
N. Franklin Reigart

United States Patent Office.

GEORGE W. HURST, OF CHESTERTOWN, MARYLAND.

Letters Patent No. 63,639, dated April 9, 1867.

---

IMPROVEMENT IN CHURNS.

---

The Schedule referred to in these Letters Patent and making part of the same.

---

TO ALL WHOM IT MAY CONCERN:

Be it known that I, GEORGE W. HURST, of Chestertown, Kent county, State of Maryland, have invented new and useful improvements in Churns; and I do hereby declare the following to be an exact description thereof, reference being had to the accompanying drawings, and to the letters of reference marked thereon, making a part of this specification, in which—

Figure 1 represents an elevation of the upright square box and levers.

Figure 2 the bottom of the beater, with incline oval apertures around the sides, and two round apertures in the centre.

Figure 3 the shaft with the beaters, and the two tubes through its centre with valves at top.

A represents the lever to operate the churn; B the upright stay attached to the outside of box C to form the fulcrum for the lever. At the one end of lever the upright shaft D is pivoted. This shaft is square and tubular, with two long pipes E throughout its length, each tube having a valve, G, at top. One of them when open admits fresh air, the other carries off the gases arising from the cream; and according to the state of the atmosphere the valves can be kept closed when required, as it is well known that the churning of butter is expedited according to dry or moist weather. H are cross-beaters for keeping all the cream in the churn in motion. At the bottom of the shaft is a horizontal square beater, J, having on each side three apertures, K, bored through diagonally, and inclining towards the corners of the shaft D and the lower part or sides of the cross-arms or beaters H, so that the cream is forced, by every downward action of the shaft D, upward against the cross-beaters H, which keeps the cream in continual motion, breaks it, and collects the butter rapidly in the bottom of the box. L is a cross-piece over the mouths of the tubes E, to prevent the small lumps of cream from passing up the tubes that might choke the tubes; it also divides the pressure of the atmosphere and gases.

What I claim, and desire to secure by Letters Patent, is—

The upright square shaft D, with its square dasher J, with oblique apertures K, with extended arms H, and atmospheric tubes E, and valves G, when arranged, constructed, and combined as herein described and for the purpose set forth.

GEORGE W. HURST.

Witnesses:
J. FRANKLIN REIGART,
JOHN S. HOLLINGSHEAD.